J. JOHANNES.
PROCESS OF TREATING LAC.
APPLICATION FILED AUG. 19, 1911.

1,024,783.

Patented Apr. 30, 1912
2 SHEETS—SHEET 1.

Witnesses

Inventor
James Johannes
By Meyers, Cushman & Rea
Attorneys

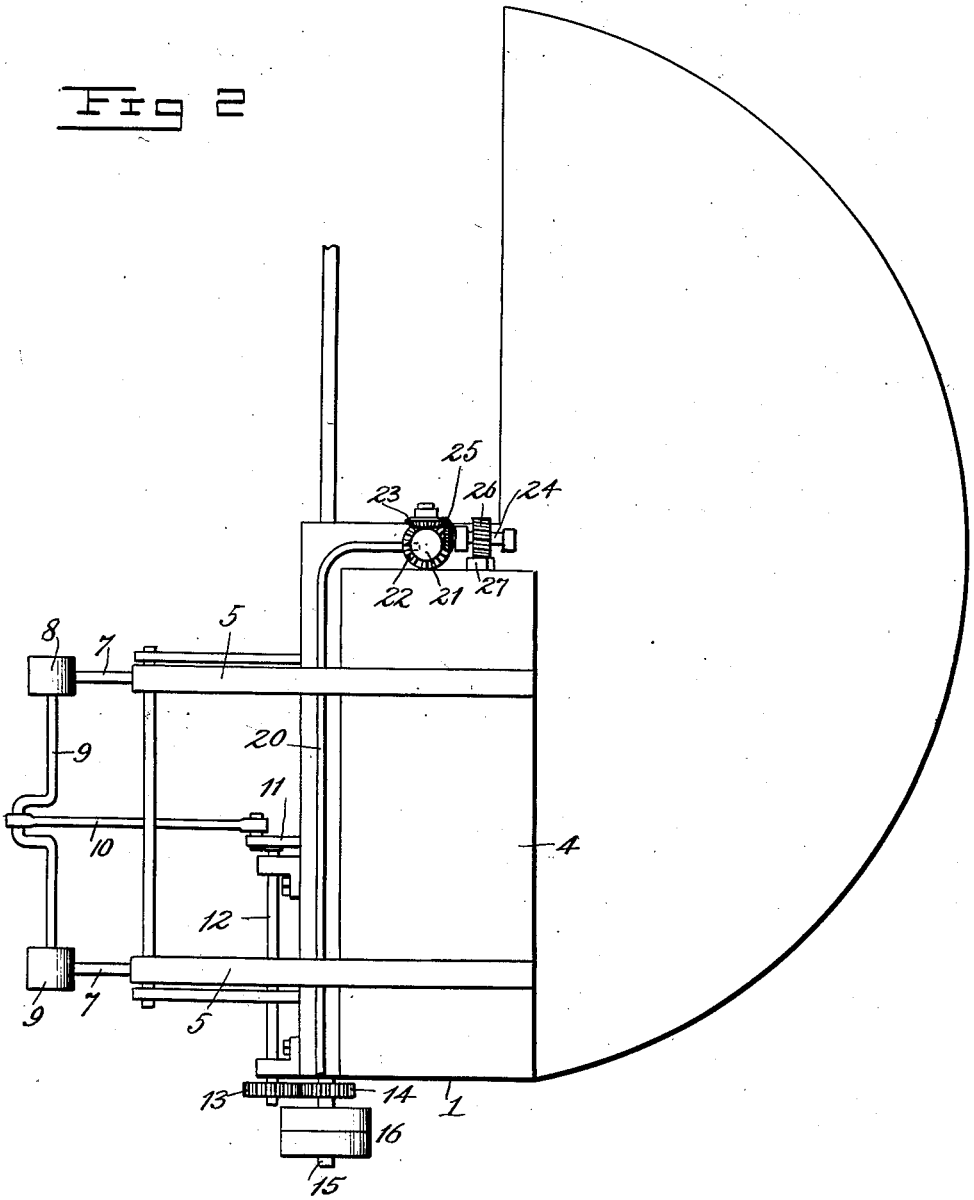

UNITED STATES PATENT OFFICE.

JAMES JOHANNES, OF CALCUTTA, INDIA.

PROCESS OF TREATING LAC.

1,024,783. Specification of Letters Patent. Patented Apr. 30, 1912.

Application filed August 19, 1911. Serial No. 645,026.

*To all whom it may concern:*

Be it known that I, JAMES JOHANNES, a subject of the King of Great Britain, residing at Calcutta, British India, have invented new and useful Improvements in Processes of Treating Lac, of which the following is a specification.

This invention relates to a method or process for treating lac, especially lac in the condition known commercially as seed lac, whereby it is changed or converted into a thread-like or fibrillous form, called "floss lac" or "laccilia."

Lac, under the ordinary varieties known as stick lac, seed lac and shell lac or shellac, when packed is very liable to conglomerate and form solid blocks or cakes, and in this condition its use is limited. These blocks or cakes must, therefore, be broken up before the lac can be used in the arts, and this operation is attended with more or less loss. In the thread-like or fibrous form, the tendency to block is greatly reduced or wholly eliminated, and a saving of lac thereby effected. Furthermore, in the fibrillous form, lac dissolves in alcohol in one fourth the time required for seed lac, shell lac or any other form of lac now known.

The herein described method employed for producing floss lac is easy and rapid, the loss in lac and by-products small and the cost nominal, its quality improved and its color made more regular.

In carrying out this invention, clean, washed seed lac, pure or adulterated, in the raw state, that is to say, having undergone no previous heating or melting process; or cold filtered lac either pure or adulterated is spread upon a preferably smooth, flat surface heated by steam, air, or other means to a temperature sufficiently high to soften or melt the lac. After the lac has been thoroughly heated and softened to the proper degree of fluidity, a second surface, in this instance relatively cold, is brought close to the fixed heated surface and in contact with the lac which immediately adheres to the cold surface, and as the latter is withdrawn the melted lac is drawn out into innumerable fibrillous threads which are attached at their ends to the two surfaces. These threads or fibers are removed from the said surfaces by means of an arm or wiper adapted to move preferably in a horizontal plane between the two surfaces and engaging the threads of lac separate them from the aforesaid surfaces and carry them to a distant point on a suitable table prepared to receive them. If desired, the fixed surface may be cold and the movable surface heated by steam or other means introduced into a chamber placed above said surfaces.

Figure 1:
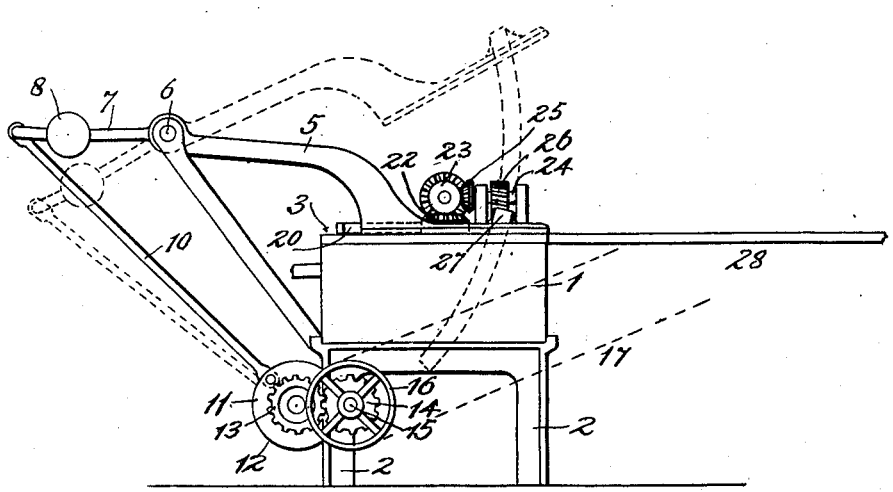
Figure 2:
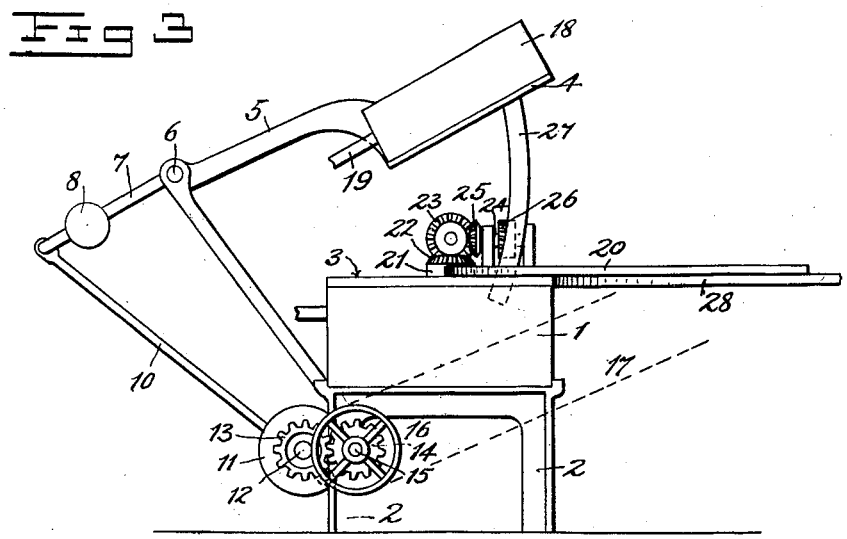

Any suitable mechanism may be used to heat the seed lac and draw it out into thread like fibers, one form of the machine being shown in the accompanying drawings, in which, Figure 1 is an end elevation of the same, Fig. 2 is a plan view, and Fig. 3 a view of the movable surface having a heated chest or chamber attached thereto.

In the drawings, the numeral 1 indicates a steam box mounted on legs 2 having a flat smooth upper surface 3 on which the lac is placed to be heated. Above the steam box 1 is a vibrating plate 4 attached to arms 5 fixed on a rock-shaft 6. Projecting back from each arm 5 is a finger 7 provided with a weight 8 to counter-balance the weight of the arms 5 and plate 4. These weights are connected together by a cross-bar 9 to which is pivoted a connecting rod 10 operated by a crank wheel 11 on a shaft 12, rotated by gearing 13 and 14, from a shaft 15 mounted in bearings in the legs 2. A belt wheel 16 on the shaft 15 is driven by a belt 17. Instead of heating the box 1 the plate 4 may be provided with a chamber 18 into which steam or heated air enters through a pipe 19 for the purpose of heating the same. In this case the top of the box 1 will serve as the cold surface for the lac. 20 indicates a wiper or shifter normally disposed behind the plate 4 and pivoted at 21, on the steam box 1. Fixed on the pivot 21 is a pinion 22 in gear with a pinion 23. On a horizontal shaft 24, is a pinion 25 in engagement with the pinion 23. A small gear wheel 26 is also mounted on the shaft 24 in position to be rotated by a curved rack 27, attached to the vibrating plate 4. As the plate rises and falls the rack 27 moves with it and as a consequence operates the gear wheel 26, and through the shaft 24 and bevel pinions 23 and 22, the shifter or wiper is moved from its normal position and passes between the cold and warm surfaces over the table 28, carrying with it the fibrillous or thread-like lac which it separates from said surface and leaves the same on the table on its return movement.

Having fully described my invention, I claim:

1. The process of treating lac, which consists in heating the same and when in a sufficiently pliable condition drawing it out until it assumes a thread-like fibrillous form.

2. The process of treating lac, which consists in heating the same until in a somewhat pliable condition, placing thereon a relatively cold surface to which said lac adheres, then separating the surfaces to draw out the lac into fibrillous threads, and finally separating the thread lac from the surfaces.

3. The process of treating lac, which consists in spreading the same on a flat heated surface until softened by the heat, then bringing into contact with said lac a smooth relatively cold surface to which said heated lac adheres, separating said surfaces to draw out the lac in fine thread-like condition, and finally removing the lac from said surfaces.

4. The process of treating lac, which consists in placing said lac between two surfaces, one of which is movable, softening the lac by heating one of said surfaces, then separating the surfaces to draw the same into fibrillous thread-like form, and finally separating the fibrillous lac from the surfaces.

5. The process of treating lac, which consists in subjecting a sheet or mass of lac to contact with and withdrawal from a heated surface and converting the same into a fibrillous form and removing the fibrillous lac.

In testimony whereof I have hereunto set my hand in presence of two subscribing witnesses.

JAS. JOHANNES.

Witnesses:
C. S. STEELEDENLIUS,
IOGESH CHUNDER BOSE.